United States Patent [19]

Jonathan

[11] 4,005,687
[45] Feb. 1, 1977

[54] CONCEALED REGENERATIVE COMBUSTION ENGINE

[76] Inventor: Johan Jonathan, 22 Milton St. North, Ashfield, New South Wales, 2131, Australia

[22] Filed: Feb. 1, 1974

[21] Appl. No.: 438,841

[52] U.S. Cl. .................................. 123/53 A; 74/25; 123/18 R; 123/32 B; 123/191 R; 123/197 A
[51] Int. Cl.² ..................... F02B 23/00; F02B 53/00
[58] Field of Search ............ 123/53 R, 53 A, 53 B, 123/53 BP, 25 C, 190 D, 191 R, 197 AB, 197 AC

[56] References Cited

UNITED STATES PATENTS

| | | | |
|---|---|---|---|
| 1,003,820 | 6/1913 | Menage | 123/190 D |
| 1,273,834 | 7/1918 | Dumanois | 123/53 A UX |
| 2,764,134 | 9/1956 | Crimi | 123/197 AB X |
| 2,879,753 | 3/1959 | McKinley | 123/25 C |
| 3,459,167 | 8/1969 | Briggs et al. | 123/191 A |
| 3,855,986 | 12/1974 | Wiss | 123/191 A |

FOREIGN PATENTS OR APPLICATIONS 502,727  3/1939  United Kingdom ............ 123/53 B Primary Examiner—William L. Freeh
Assistant Examiner—Michael Koczo, Jr.
Attorney, Agent, or Firm—Paul J. Sutton

[57] ABSTRACT

This invention relates to a combustion engine which is cooled internally. Combustion occurs in primary combustion chambers and the gas combustion products are released into secondary chambers after combustion to mix with cooler fluids. These fluids cool the engine body during engine operation. A preferred form of the invention consists of a semi-rotary engine and means for joining the rotor of this engine to the output power shaft. Preferred engines of this invention will not require external cooling or use poppet valves and will be able to operate as both a four-stroke and two-stroke engine.

1 Claim, 10 Drawing Figures

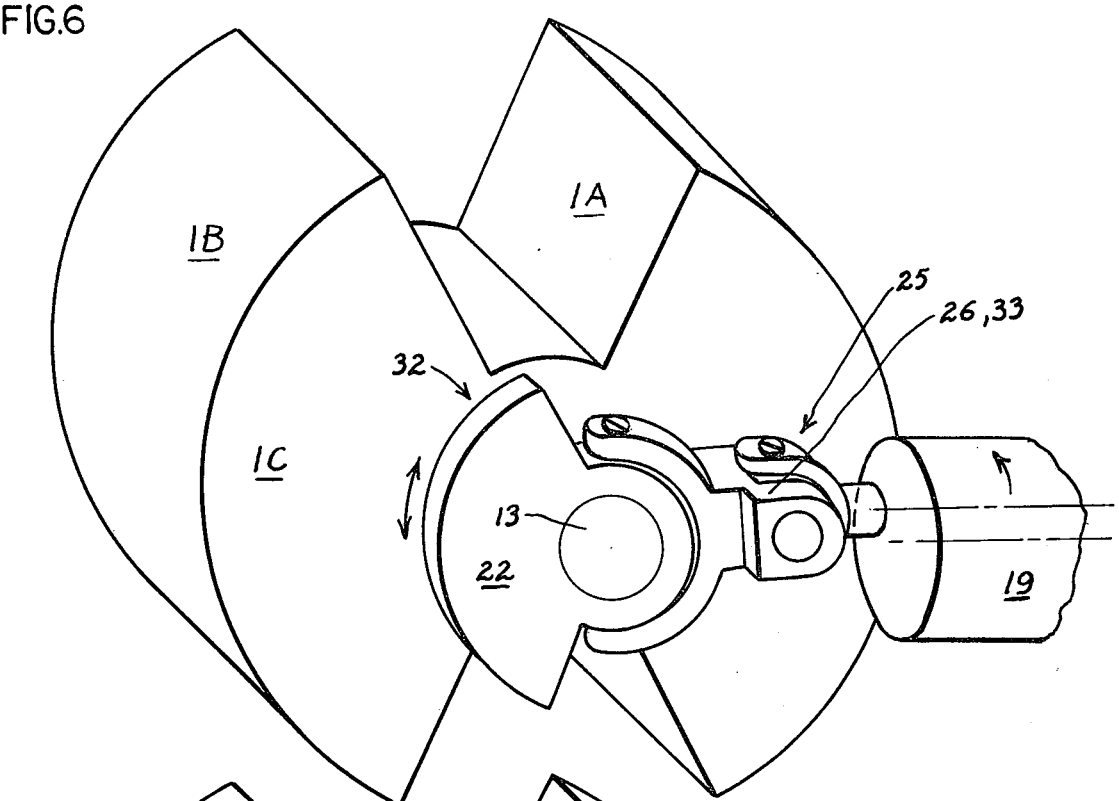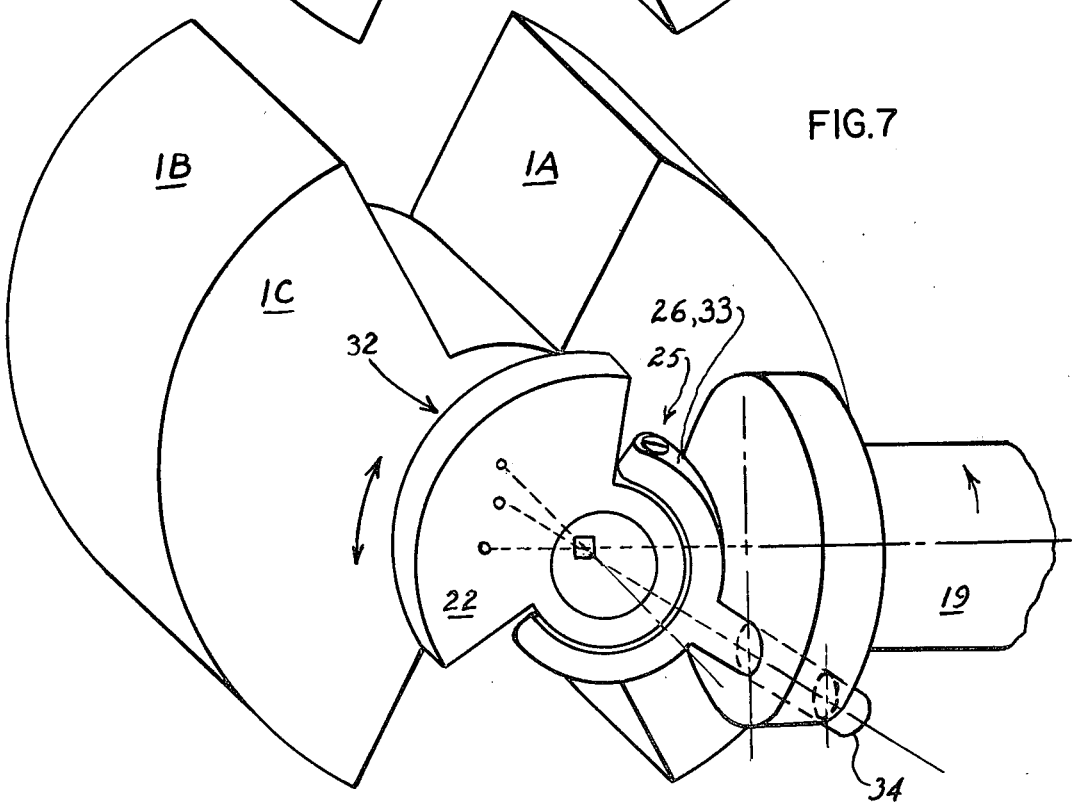

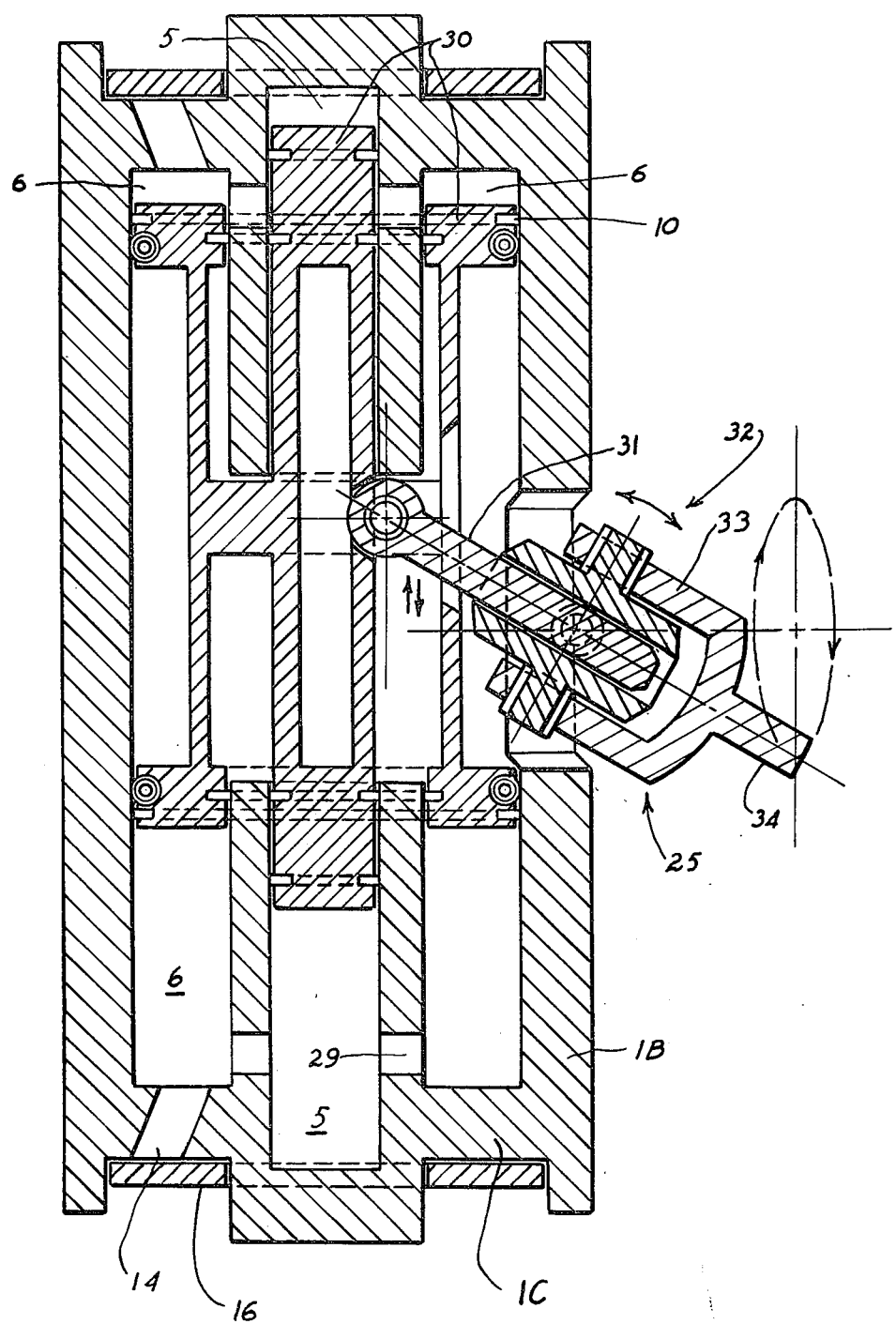

CONCEALED REGENERATIVE COMBUSTION ENGINE

This invention relates to combustion engines designed using a new design basis termed herein as a Concealed Regenerative (Internal) Combustion Engine Principle, or in short C.R.(I).C.E. Principle. This principle is particularly useful in designing the new types of semi-rotary combustion engines disclosed in this specification. However, the C.R.(I).C.E. principle could also be used in the design of common internal or external reciprocating, rotary and orbital engines. Even so a new type of semi-rotary internal combustion engine is seen as the widest application of this new principle.

Engines designed according to the invention in this application should have increased efficiency and thus cost less to operate. Fuel consumption and also the amount of pollution produced by an engine according to this invention should be greatly reduced compared to conventional engines of the same output power. With rising fuel costs and increasing pollution of major World Countries it is envisaged that this engine will have its widest application in motor vehicles.

Preferred engines according to this invention will revolutionize the motor industry since the engines
1. will not require an external cooling system (either air, water or other fluid cooling system).
2. will not use poppet valves.
3. will be able to be used as a four-stroke as well as two-stroke engine by operating the valves of the engine at different speeds.

The following is a definition of some of the important concepts used throughout this specification:

Primary radiation energy — is defined as the energy liberated at ignition and during combustion of gases in a combustion engine.

Secondary radiation energy — is defined as the energy liberated by hot gases just after combustion in a combustion engine.

These definitions are not rigid and some secondary radiation energy can be due to the residual combustion or ignition of gases.

| C.R.(I).C.E. PRINCIPLE | CONVENTIONAL PRINCIPLE |
|---|---|
| Gas combustion takes place in an enclosed space (termed herein as the primary combustion chamber) and shortly after combustion is released from the primary combustion chamber to mix with cooler fluids before being exhausted. | Hot gases after combustion do not mix with cooler fluids during expansion. |
| The hot gases after combustion are released from the primary combustion chamber to one or more secondary expansion chambers. | No separate primary combustion chamber and secondary expansion chamber. |
| Preferably the primary combustion chamber is enclosed by shields to prevent the loss of primary radiation energy (termed herein as primary radiation shields). | No primary radiation shields. |
| Preferably the secondary chamber or chambers are spaces enclosed by radiation shields (termed herein as secondary radiation shields) to prevent the loss of secondary radiation energy. | No secondary radiation shields. |
| Fluid is taken into the engine chambers for the purpose of internally cooling combusted gases and the engine body and to thus reduce or eliminate the need for external cooling. Cooling of the engine may occur during expansion of the combusted gases as well as during other phases of the engine operation. | No internal cooling. |

The work chambers of an engine according to this invention are given the same meaning as that in conventional engines, i.e., the chamber through which in a combustion engine the piston or rotor moves. The work chambers in an engine according to this invention may contain one or several primary combustion chambers and also contain one or many secondary expansion chambers. These secondary expansion chambers are preferably also designed to prevent the loss of secondary radiation energy. The work chambers may consist wholly of primary combustion or secondary expansion chambers or may contain further chambers wherein primary and secondary radiation does not occur.

The primary combustion chamber is the chamber wherein combustion occurs and is preferably the space enclosed by primary radiation shields at the instant of combustion and for a short time after combustion. The primary combustion chamber would have incorporated in one side a means for igniting the gas such as one or more spark plugs or glow plugs and also means for the injection of combustible fuel into the primary combustion chamber. On initial expansion of the gas combustion products, some of the primary radiation shields move so that the hot gas products are no longer contained within the primary combustion chamber and move into a secondary expansion chamber. The volume of the primary radiation chamber may expand before gas combustion products are released to the secondary expansion chamber. Alternatively the space enclosed by the primary radiation shields may be a fixed volume.

The secondary expansion chamber is preferably surrounded by secondary radiation shields to reduce the loss of secondary radiation energy from gas combustion products. The secondary expansion chamber may have incorporated therein one or more glow plugs or other means for igniting gases that have not undergone complete combustion.

A general form of the invention is a combustion engine wherein combustion takes place in one or more spaces (termed herein as primary combustion chambers) which are enclosed at the instant of combustion, said engine being designed so that shortly after combustion the gas combustion products are released into one or more secondary expansion chambers.

Another general form of the invention is a combustion engine containing primary radiation shields which form one or more primary combustion chambers wherein combustion takes place and is designed so that the gas combustion products are released from the primary combustion chamber to mix with cooler fluids in one or more secondary expansion chambers. The secondary expansion chambers may be formed from secondary radiation shields which prevent the loss of secondary radiation energy.

One preferred form of the invention is a combustion engine containing primary and secondary radiation shields as above and comprising a rotor consisting of at least one vane attached to a shaft, said vane being able to move with an oscillating movement co-axially with the shaft within one or more work chambers containing ports for gas intake and exhaust.

In one particular example of this preferred form, the rotor consists of a shaft with two co-axial vanes that move through two work chambers which are substantially equal in shape and opposite each other and form sectors of a cylinder. The rotor shaft is also cylindrical with the same axis as the cylinder containing the work chambers and is positioned at the centre of this cylinder. The rotor vanes divide each work chamber into two zones. Each zone of the work chamber contains primary combustion shields which form the primary combustion chamber at combustion.

FIGS. 6 and 7 are perspective-type views which illustrate the means of attachment as between the oscillating rotor shaft of this invention and the relating power output shaft; and FIG. 8 is a partial sectional plan view of piston embodiment of my invention, as described in more detail more fully below.

FIGS. 1 to 8 show a preferred embodiment of the invention in detail. The engine shown in these figures has two work chambers incorporated in a stator as shown in FIG. 8.

1 (A) shows one radial lateral side of a work chamber.
1 (B) shows the radial circumferential side of the stator.
1 (C) shows the radial cross-end side of the stator.

The rotor consists of a cylindrical shaft 13 and attached to this shaft are two vanes 2 which are shaped and dimensioned so that they can oscillate through the work chambers. One of these vanes is shown in detail in FIG. 1. Each vane divides the work chamber through which it moves into two zones. In these zones there occurs the intake, compression, expansion and exhaust phases of the internal combustion cycle.

Primary Combustion Chamber

Attached to the vanes and the stator are primary radiation shields 7. These primary radiation shields are shown in FIG. 1 which also shows the vane positioned against the stator so the radiation shields enclose a space called the primary combustion chamber 5.

Figure 4:
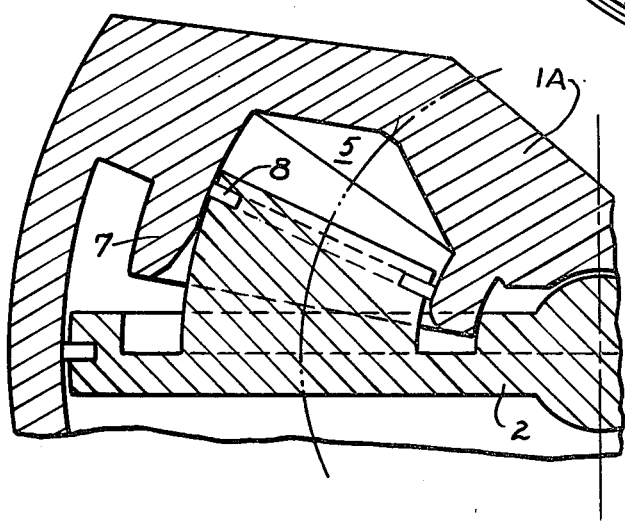
FIGS. 4 and 5 are partial sectional views illustrating the shapes and disposition of rotor vanes according to this invention.
Figure 4A:
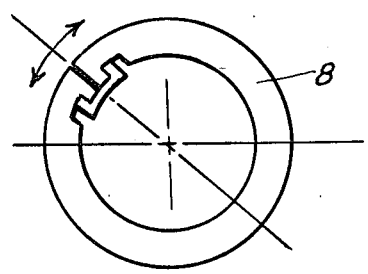
FIGS. 4a and 5a are plan views of sealing rings shown in FIGS. 4 and 5, respectively.
Figure 5:
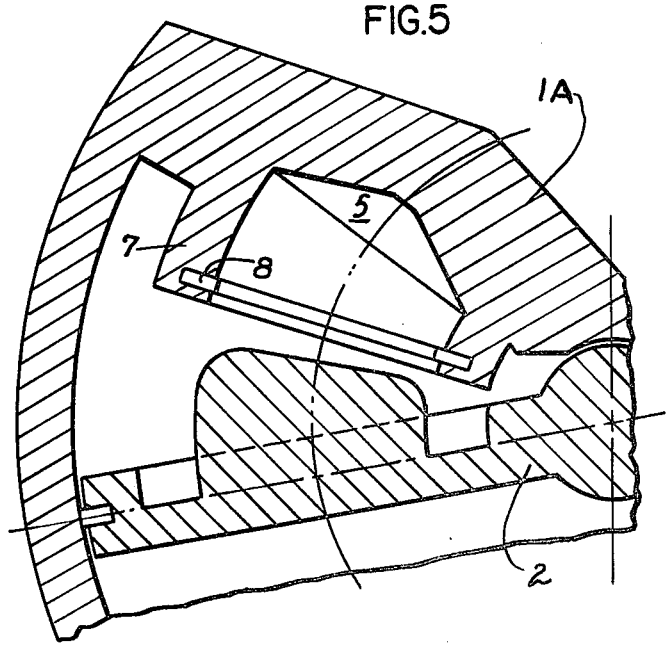
Figure 5A:
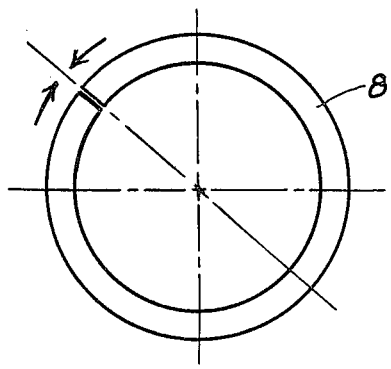

In this preferred embodiment of the invention, FIGS. 4 and 5 show how the rotor vane is shaped and dimensioned to move in and out of an insert in the stator and form an enclosed area, i.e., the primary combustion chamber 5. Ignition is provided in the primary combustion chamber by means of a spark plug 4 and fuel is injected into the primary combustion chamber through a fuel injector 3 (see FIG. 1). The spark plug could be replaced by any other ignition means, e.g., one or more glow plugs.

The primary radiation shields 7 reduce the loss of primary radiation energy from the primary combustion chamber and are also designed to withstand the high temperatures and pressures that occur during gas combustion.

Figure 1:
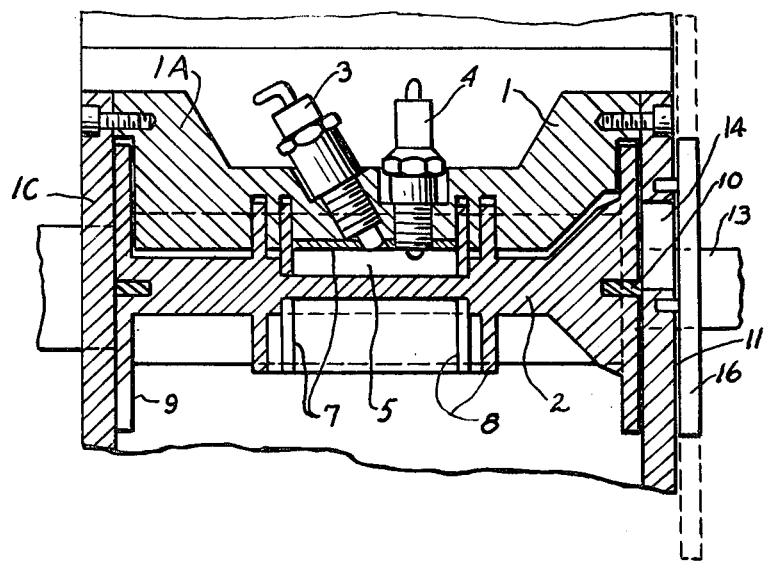
FIG. 1 is a fragmentary sectional elevational view of a preferred embodiment of an internal combustion engine according to the present invention.

In this preferred embodiment of the invention there is also incorporated in the engine primary compression seals 8 and these are shown in FIG. 1. These compression seals reduce friction between the vane and the stator and also contain compressed gas before ignition and while primary radiation energy is being liberated.

Secondary Expansion Chamber

As shown in FIGS. 4 and 5 when the rotor vane moves away after combustion from the radial lateral side of the work chamber, gas is released from the primary combustion chamber into a space termed in the specification as a secondary expansion chamber.

In this preferred embodiment of the invention there are incorporated into both the vane and the stator secondary radiation shields 9. These shields reduce the loss of secondary radiation. The vanes also have incorporated secondary compression seals 10.

The volume of the secondary expansion chamber can vary in relation to the primary combustion chamber. The peak compression pressure in the secondary expansion chamber can thus also vary depending on the size of the engine and its design. Thus the need for secondary compression seals depends on the peak compression pressure designed for the secondary expansion chamber and the size of the secondary expansion chamber. FIG. 1 shows the secondary compression seals 10 and these are also shown in FIGS. 4 and 5.

Work Chamber Ports

Figure 2:
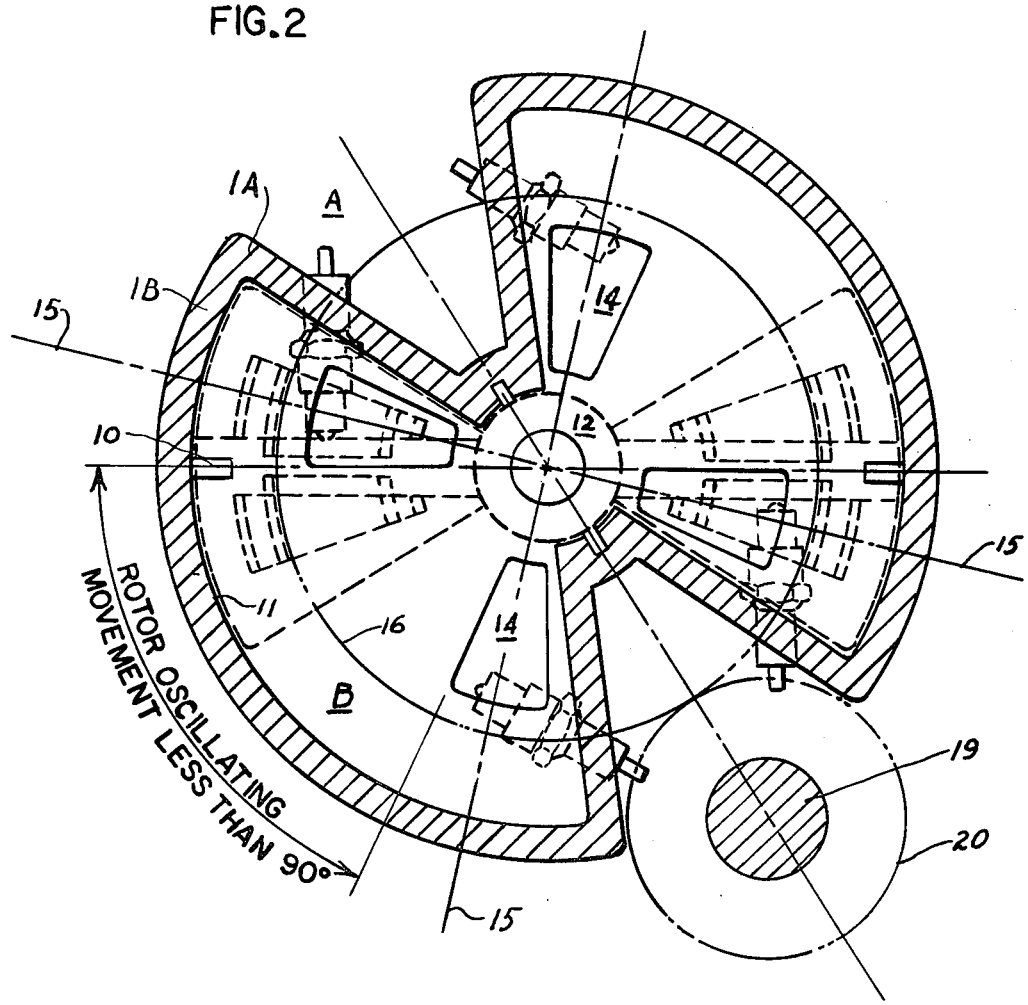
FIG. 2 is a sectional schematic end view illustrating the disposition of elements shown in FIG. 1.

The work chamber has ports 14 shown in FIGS. 1 and 2 which allow for gas inlet and outlet from the work chamber. These ports are termed herein as work chamber ports.

FIG. 2 illustrates that in this particular embodiment of the invention the work chamber ports are located at right angles to each other along the quadrant lines shown. These ports serve both for inlet and outlet of gas from the work chamber.

Servo Disc Valves

Figure 3:
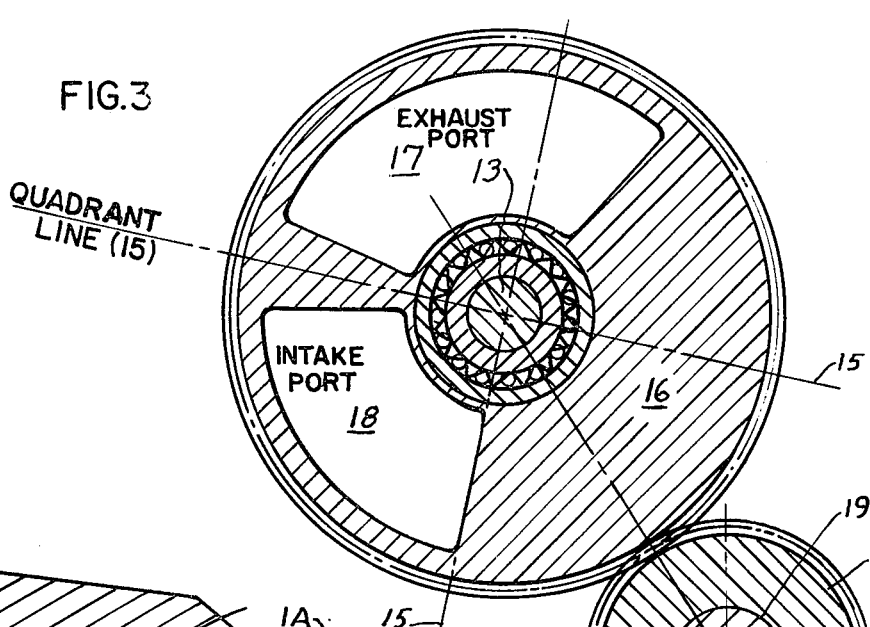
FIG. 3 is a sectional schematic rear end view of the embodiment of this invention shown in FIGS. 1 and 2.

This embodiment of the invention contains one servo disc valve 16. The end view of the servo disc valve is shown in FIG. 3. The servo disc valve has two ports one for the intake of gas into the work chamber and one to facilitate the exhaust of gas from the work chamber. These ports are termed in the specification the valve intake port 18 and valve exhaust port 17.

The servo disc valve 16 faces the cross-end side of the stator. The valve is designed so that at certain positions the work chamber ports and valve ports align to allow intake to and exhaust of gas from the work chamber.

In this particular embodiment of the invention only one servo disc valve is necessary because the work chamber ports are located at right angles and each vane oscillates through an angle of less than 90°. However, if the work chamber ports were not located at 90° and/or the rotor vane oscillated through an angle of greater than 90°, more than one servo disc valve would be required.

The shape and position of the servo disc valve shown in this preferred embodiment of the invention can be varied for different applications of this invention. This invention in fact may not then require servo disc valves, e.g., if the C.R.(I).C.E. Principle was applied to a conventional four cylinder piston engine. However a four cylinder engine has been designed according to this principle using a servo disc valve.

Seals surround the expansion chamber ports and face the servo disc valve. These seals may be made from graphite material.

Rotor Shaft and Power Shaft

The rotor of the engine according to this embodiment of the invention consists of a cylindrical rotor shaft 13 which is shown in FIGS. 1, 6 and 7 and a rotor lever 22 which is shown in FIGS. 6 and 7. FIGS. 6 and 7 show different means for connecting rotor lever 22 to the power output shaft 19A.

FIG. 6 illustrates means of transferring the oscillating movement of the rotor shaft to the rotating power output shaft 19A. FIG. 6 shows attached to the power shaft an inner shaft (free sliding bar) parallel to the power shafts' axis but at an "eccentric" to said axis. The said inner shaft is then connected with the variable rotor lever by means of a universal joint 25 and hinge saddle 26. The hinge saddle 26 is pivotally connected to the rotor lever 22.

The power shaft 19A would then rotate when the engine is in operation and transmit its motion to any external means, with or without the use of a fly wheel or a multiple clutch.

During the running of the engine, prior to the release of the hot gases after combustion from the primary combustion chamber to the secondary expansion chamber, the temperature is lowered as is the radiation energy to the walls of the primary combustion chamber. This reduction in radiation energy is reduced in proportion to the fourth power of the absolute temperature of the hot gases according to Stefan-Boltszmann Radiation Law.

$$W = e \times s \times T^4$$

where
- $W$ = the radiated heat energy
- $e$ = emmissivity factor
- $s$ = Stefan-Boltszmann constant
- $T$ = absolute temperature.

The use of a regenerative reacting spring device conserves the energy not lost due to the decreased temperature of gases after combustion. The pressure of the combusting gases also decreases as well as the temperature due to an accelerated movement of the rotor and heat energy is conserved in the reacting coil spring in the form of mechanical potential energy. Thus the reacting spring device reduces the loss of heat energy to the walls and ensures a more even transfer of work energy to the power shaft. Thus the effect of the dead centre in conventional engines is reduced. The use of the regenerative spring device saves energy that in conventional motors is transferred to the external cooling system. Further explanations of the use of the regenerative reacting spring device are as follows:

1. The conserved mechanical potential energy would be entirely transferred to the power shaft after the rotor has completed about half the expansion stroke.
2. The regenerative coil spring device would not commit any work during the compression stroke and therefore would require to be locked using guides or automatic locking devices during the compression stroke. The locking device would be unlocked during the expansion stroke. The locking device is not shown in FIG. 5.
3. The location of the reacting spring device could be
   a. between the rotor shaft and the power shaft
   b. within the body of the power shaft, or
   c. in the body of its fly wheel.

Materials of Construction

The primary and secondary radiation shields are designed to prevent the loss of primary and secondary radiation energy and in this preferred embodiment of the invention are constructed of heat resistant and non-corrosive materials. Nickel, chromium alloys such as inconel can be used or other suitable materials such as titanium or zirconium alloys.

Other parts of the engine may also be constructed of materials that are heat resistant and also poor heat conductors, e.g., sides of the stator and the rotor shaft and vanes. These materials would reduce the heat loss from the work chambers and improve the effectiveness of the internal cooling which will be mentioned later in the specification.

Lubrication

The parts of the engine of this embodiment of the invention that are either themselves moving or in contact with moving parts require lubrication. Most of these parts would operate at quite low temperatures and therefore generally an oil or liquid form of lubrication could be used. Alternatively graphite or graphite impregnated materials or other dry types of lubrication could be used. Rotor seals, seals of the work chamber ports, rotor shaft bearings and other bearings can be made of graphite or graphite impregnated materials or other materials which can accommodate oil/liquid lubrication.

Reducing the need for lubrication

Lubrication requirements can be reduced by designing the engine with the following characteristics:
- Designing a low maximum operating temperature for the secondary expansion chamber;
- Designing the engine so that the ratio of the secondary expansion chamber to the primary combustion chamber volume is large;
- Designing close tolerances between the rotor and stator;
- Using non-friction bearings between the rotor shaft and stator.

Rings and seals for piston or rotor

Rings or seals are used in this invention to seal the primary combustion chamber from the secondary expansion chamber and also to seal one work chamber from another (see FIGS. 4 and 5). A spring may be used to provide the sealing force for the seals or the seals themselves may have "springy characteristics." Other devices utilizing the centrifugal force of the rotating rotor or devices exerting electromagnetic or magnetic force on the seals may provide the sealing force.

Fly Wheel

The semi-rotary combustion engine illustrated in the Figures can contain one or many fly wheels. These can either be "conventional" fly wheels attached to the power shaft that rotate with the same speed of rotation as the power shaft (19). The engine can also contain "dynamic" fly wheels which rotate with a lower or higher speed of rotation to the power shaft. The engine may contain one or many conventional or dynamic fly wheels.

Work Phases

The rotor divides each work chamber in the embodiment of the invention shown in the FIGS. into two zones. (There are two work chambers and therefore four zones). In each zone the four combustion cycles of an internal combustion engine takes place, i.e., intake phase, compression phase, expansion phase and exhaust phase. In fact during the operation of the engine, at any one time, one of these phases is taking place.

Intake of air occurs into one of the four zones of the engine when the work chamber port in that zone is aligned with the servo valve intake port. During the intake phase the volume of the zone increases and air is drawn into the zone.

In the zone of the work chamber on the other side of the rotor whose volume is decreasing, the air is compressed during the compression phase. FIG. 1 illustrates the position of the vane of the rotor situated against the radial lateral side (1A) of the work chamber at the end of the compression step and at combustion.

Combustion takes place in the primary combustion chamber and the rotor moves away from the radial lateral side. The primary combustion chamber 5 expands initially and finally releases the combusted gases into the secondary expansion chamber 6. This is the expansion phase of the combustion cycle and the volume of the zone where the expansion phase is taking place increases.

As this volume is increasing the volume of the zone on the other side of the rotor is decreasing and in fact gas is being exhausted from this side of the rotor through the work chamber port 14 and valve exhaust port 17. This zone is going through the exhaust phase.

Expansion phase

The primary radiation shields 7 may be positioned so that during the initial part of the expansion phase the volume of the primary combustion chamber increases. This is shown in FIG. 5. Alternatively the volume of the primary combustion chamber may not change before the combusted gases are released to the secondary expansion chamber.

At combustion the fuel injector will spray a discrete quantity of fuel into the primary combustion chamber and one or more glow plugs or spark plugs would ignite the fuel mixture.

It is an aspect of this invention that the combusted gases are released from the primary combustion chamber into the secondary expansion chamber which contains uncombusted air during the expanson phase and which cools immediately the combusted gases. Thus the loss of primary and secondary radiation energy is prevented.

When the vane of the rotor is in a position as shown in FIG. 1, the gas compressed in the primary combustion chamber may have a volume of about one-tenth of the gas compressed in the secondary expansion chamber. After release of the gas into the secondary expansion chamber the primary combustion chamber ceases to be an enclosed space.

Internal Cooling

In most embodiments of this invention the combusted gas is released from the primary combustion chamber and would be cooled by air in the secondary expansion chamber. In addition, a secondary cooling substance such as water, a water based substance or any other liquid may be injected into the secondary expansion chamber to act as an additional means for cooling the combusted gases. This secondary cooling substance may be introduced into the work chamber with the air during the intake phase of the combustion cycle, i.e., through the valve intake port. Alternatively the secondary cooling substance may be sprayed or injected into the work chamber during the expansion phase.

Thus cooling of the gas and most parts of the engine occurs during the expansion phase and in fact in all the other phases of the combustion cycle.

Mechanical Cooling Devices

Mechanical cooling devices may also be incorporated into the primary combustion chamber and secondary expansion chamber to improve the cooling of the combusted gas. These mechanical devices cool the gas in the chambers and the engine, not only in the expansion phase but in the other phases.

These cooling devices may take the form of:
1. fins or thin plates in the sides of the work chamber;
2. wires or thin wires in the sides of the work chambers;
3. inserts or small holes in the work chambers;
4. gas oscillators or vibrators.

These cooling devices may be integrated into the piston, cylinder head, rotor or stator.

Fuel Injectors, Carburetors and Ignition Means

Embodiments of this invention require fuel injectors and/or fuel vaporization means, carburetors and ignition means.

One or more glow plugs or spark plugs may be required to ignite the fuel injected into the primary combustion chamber. In addition an engine according to this invention may also have included in the secondary expansion chamber means for igniting any gases not fully combusted in the primary combustion chamber.

Combustion can also be achieved due to gas compression, i.e., as in a diesel system. Also a catalyst may be used to insure combustion at certain pressures and temperatures in the primary combustion chamber or secondary expansion chamber.

Operating the Semi-Rotary Engine as Two Stroke or Four Stroke Engine

By changing the speed of the servo disc valve of the embodiment of this invention shown in the figures it is possible to operate the engine as a two stroke rather than four stroke engine. Thus there would be only two phases in each zone, i.e., combined intake/compression phase and combined expansion/exhaust phase.

Other Embodiments of this Invention

The semi-rotary engine shown in the Figures is only illustrative of the engines that can be developed using the C.R.(I).C.E. principle. This principle can be used in conventional motor vehicle combustion engines. The ignition could take place in an insert in the top of each cylinder of the engine, this insert forming at the instant of combustion, the primary combustion chamber. After combustion when the piston moves away from the top of the cylinder, gas would flow from this insert into the rest of the cylinder. It would there, during the expansion phase, be cooled by air or another cooler fluid.

Another form of an engine using the C.R.(I).C.E. principle would be one which has a single primary combustion chamber surrounded by several secondary expansion chambers. After combustion takes place in the primary combustion chamber the combusted gases would then flow into several secondary expansion chambers simultaneously and be cooled by the cooler fluids in these chambers. The primary combustion chamber can be a cylinder containing a piston and it can be surrounded with, for example, four secondary expansion chambers which are also cylinders containing pistons. This invention can also be applied to two-stroke as well as four-stroke engines and to an orbital or rotary system.

FIG. 8 is a cross-sectional view of another embodiment of the invention which has two cylindrical primary combustion chambers 5 and two annular secondary expansion chambers 6. FIG. 8 shows that the pistons 30 that move through the primary combustion and secondary expansion chambers have one body. As the piston in the primary combustion chambers move, so the volume of the chambers increases, and gas is released into the secondary expansion chambers through ports 29 joining the primary combustion and secondary expansion chambers. This body containing the pistons is connected to a rotating power shaft (not shown) by means of a piston lever 31, rotationally reciprocating body 32, hinge saddle 33 and a shaft 34. This system of converting reciprocating motion to rotary motion is also shown for the servo rotary engine in FIG. 7.

Semi-Rotary Engine, Pump or Compressor not using the C.R.(I).C.E. Principle

This application is also meant to include an engine, pump or compressor consisting of a shaft with two coaxial vanes that move through two work chambers which are substantially equal in shape and opposite each other and form sectors of a cylinder, said work chambers containing gas inlet and outlet ports. Thus it is intended that this application cover a semi-rotary pump with the similar construction to that of the semi-rotary engine in the Figures using a servo disc valve for intake and exhaust of gas. Of course there would generally be no need to have separate primary and secondary chambers in the pump since combustion would not take place.

What I claim is:

1. An internal combustion engine characterized by its ability to operate in multi-stroke modes, comprising, in combination: an engine body formed with first and second end head portions disposed at opposite ends of and being integral with an outer annular wall, said outer annular wall having inwardly facing surfaces, said body including first and second spaced substantially central and concentrically extending hollow cylindrical first and second combustion walls each defining separate first and second combustion chambers therewithin, said first and second combustion walls being integral with said respective first and second engine body end head portions, said first and second combustion walls further defining first and second annular expansion chambers intermediate outer surfaces thereof and said inwardly facing surfaces of said outer annular wall, said first and second annular expansion chambers extending concentrically about said first and second combustion chambers, respectively, each of said first and second end head portions being formed with a port extending therethrough in communication with said first and second annular expansion chambers, each of said first and second combustion walls being formed with a port extending therethrough at a predetermined distance from said respective first and second end head portions and in communication with said combustion and expansion chambers, said outer annular wall having a substantially central relief opening, a piston assembly supported for reciprocating movement within said engine body, said piston assembly including an elongated central inner portion extending between first and second piston end portions thereof, said piston end portions being integral with a central portion having an outwardly extending flange, said piston assembly further comprising an elongated outer portion integral with said flange and extending between first and second annular piston discs, said first and second piston end portions being slidably disposed within said first and second combustion chambers, respectively, said first and second annular piston discs being slidably disposed within said first and second annular expansion chambers, piston sealing rings carried by each of said piston end portions as well as each of said piston discs, said sealing rings each remaining in contact with the respective chamber with which it is associated during the entire stroke of said piston assembly, conversion means pivotally supported and disposed in part within said central relief opening for converting rectilinear reciprocatory movement of said piston assembly into arcuate movement, linkage means interconnecting said piston assembly and said conversion means, valve means associated with each of said end head portion ports for controlling the flow of fluid therethrough, the presence of said first piston end portion adjacent to said first end head portion at one extremity of the stroke of said piston assembly sealing said first combustion wall port, thereby sealing said respective combustion and expansion chambers from each other, and cooling means supported by said first engine body end head portion for transferring heat generated within said first and second combustion chambers from said engine body to fluid disposed within said first and second expansion chambers, said cooling means comprising a plurality of substantially thin members of predetermined size and shape.

* * * * *